United States Patent
Makarios et al.

(10) Patent No.: US 6,502,134 B1
(45) Date of Patent: Dec. 31, 2002

(54) TUPLE-BASED INFORMATION SPACE FOR DATA EXCHANGE BETWEEN APPLICATIONS

(75) Inventors: Selene K. Makarios, Mountain View, CA (US); Robert C. Fitzwilson, Atherton, CA (US); Heather L. Downs, Mountain View, CA (US)

(73) Assignee: NextPage, Inc., Lehi, UT (US)

( * ) Notice: Subject to any disclaimer, the term of this patent is extended or adjusted under 35 U.S.C. 154(b) by 0 days.

(21) Appl. No.: 09/458,259

(22) Filed: Dec. 9, 1999

Related U.S. Application Data

(63) Continuation-in-part of application No. 09/305,427, filed on May 5, 1999.

(51) Int. Cl.$^7$ ............................................. G06F 15/173
(52) U.S. Cl. .................... 709/225; 709/200; 709/202; 709/203; 709/217; 707/3; 707/10; 707/100
(58) Field of Search ................................. 709/200–203, 709/217, 220, 225, 227–228, 230, 236, 242, 105; 707/3, 9, 10, 100, 102, 104, 200, 202–203

(56) References Cited

U.S. PATENT DOCUMENTS

| | | | |
|---|---|---|---|
| 5,774,660 A | * 6/1998 | Brendel et al. | 709/201 |
| 5,860,010 A | 1/1999 | Attal | 717/137 |
| 5,881,315 A | * 3/1999 | Cohen | 709/202 |
| 5,963,642 A | * 10/1999 | Goldstein | 707/1 |
| 5,963,947 A | * 10/1999 | Ford et al. | 709/203 |
| 5,964,841 A | * 10/1999 | Rekhter | 709/242 |
| 5,974,420 A | 10/1999 | Lehman et al. | 707/101 |
| 6,029,160 A | * 2/2000 | Cabrera et al. | 707/1 |
| 6,094,673 A | * 7/2000 | Dilip et al. | 709/202 |
| 6,112,242 A | 8/2000 | Jois et al. | 709/225 |
| 6,115,715 A | * 9/2000 | Traversat et al. | 707/100 |
| 6,119,157 A | * 9/2000 | Traversat et al. | 709/220 |
| 6,151,624 A | 11/2000 | Teare et al. | 709/217 |
| 6,195,652 B1 | 2/2001 | Fish | 707/2 |
| 6,301,584 B1 | 10/2001 | Ranger | 707/103 |

FOREIGN PATENT DOCUMENTS

| | | | |
|---|---|---|---|
| JP | 404287121 A | 10/1992 | G06F/9/06 |

OTHER PUBLICATIONS

Sun, J. et al., "Searching the World–Wide Web Using Signature Files," Computer Science and EE Dept., University of Maryland Baltimore County, MD, no date, 4 pp.
Linda User's Guide & Reference Manual, Version 0.3, Scientific Computing Associates, Jan., 1995.
Bray et al., eds., "Extensible Markup Language (XML) 1.0," w3.org/TR/REC–xml, Apr. 3, 1999, pp. 1–37.
A. I. T. Rowstron et al., "BONITA: A set of tuple space primitives for distributed coordination," IEEE System Sciences Proceedings 1997, pp. 379–388.
Widergren et al., "XML for Data Exchange," Power Engineering Society Meeting, Jul. 1999, IEEE pp. 840–842.

* cited by examiner

*Primary Examiner*—Bharat Barot
(74) *Attorney, Agent, or Firm*—Skjerven Morrill LLP

(57) ABSTRACT

A mechanism for providing application-layer information persistence and exchange is provided. For an exemplary embodiment, an information space is constructed to span a group of one or more server systems. The information space is based on the tuple-space paradigm first introduced for the Linda coordination model. A coordination entity manages storage of tuples within the information space. Applications access tuples by consulting a local cache of known tuple locations. If the location of a tuple is known, access is directed to the known location. If the location is unknown, the coordination is queried to determine the correct tuple location. If a tuple has moved, the previously storing server generates a re-route exception. This causes the accessing application to query the coordination entity, retry the access, and update the local cache.

16 Claims, 1 Drawing Sheet

TUPLE-BASED INFORMATION SPACE FOR DATA EXCHANGE BETWEEN APPLICATIONS

RELATED APPLICATIONS

This application is a Continuation-In-Part of U.S. application Ser. No. 09/305,427 entitled "Method for Coordinating Activities And Sharing Information Using a Data Definition Language" filed May 5, 1999 still pending. That disclosure is incorporated in this document by reference.

FIELD OF THE INVENTION

The present invention is generally related to computer networking. More specifically, the present invention includes a mechanism that provides application-layer information persistence and exchange. This mechanism is scalable, generically applicable, transparently-distributed and based on the tuple-space model.

BACKGROUND OF THE INVENTION

Most modern computer systems are designed to use a layered approach to interprocess communication and networking. The layered approach subdivides the tasks associated with interprocess communication and networking into levels of abstraction. This has been found to be an effective method for reducing the complexity and increasing the reliability of programs and systems that use interprocess communication.

The International Organization for Standardization (ISO) has promulgated a commonly used standard that embodies a layered approach of this type. This standard, know as the ISO Network Reference Model, is based on seven different levels of abstraction. The seven layers are known as the application, presentation, session, transport, network, data link and physical layers.

The communications protocols used in the lower levels of the ISO Network Reference Model (i.e., the transport, network, data link and physical layers) are relatively well defined. As a result, these protocols tend to be used, for almost all applications that perform interprocess communication.

Unfortunately, this type of homogeneity does not really exist at higher levels of the ISO Network Reference Model. Entities at these levels (i.e., the application, presentation and session layers) tend to interact with their peers using special-purpose protocols. Not surprisingly, this type of one off use does little to further the overall effectiveness of the ISO Network Reference Model. Instead, there is a tendency towards increased complexity and lost opportunities for software reuse.

The ISO Network Reference Model is, unfortunately, not the only networking environment that exhibits this lack of homogeneity. In fact, these symptoms are generally present (to a greater or lesser extent) in all layered interprocess communication and networking systems.

For these and other reasons, a need exits for more generic methods that provide interprocess communication at higher levels of layered interprocess communication and networking systems. Methods of this type would preferable provide uniform interprocess communication protocols at the application level of the ISO Network Reference Model. These methods would also preferably be scalable to work in networks of all sizes without significant performance degradation.

SUMMARY OF THE INVENTION

The present invention includes a method and apparatus for providing application-layer information persistence and exchange. For an exemplary embodiment, an information space is constructed to span a group of one or more server systems. The information space is based on the tuple-space paradigm first introduced for the Linda coordination model. A coordination entity manages storage of tuples within the information space. The coordination entity determines where in the information space tuples are stored. The coordination entity makes this determination both at initial tuple storage and as tuples are moved to achieve load balancing and other goals.

Applications access stored tuples by requesting the tuple from their local servers. If the local server knows where the tuple is stored, the local server forwards the request directly to the storing server. In the alternative, (i.e., where the local server does not know where a tuple is stored), the local server queries the coordination entity for the tuple's location. The local server then uses the query result to request the tuple from the storing server. In this case the local server also records the location of the tuple for future reference. This allows the local server to directly request the tuple on subsequent accesses.

In some cases, a tuple will have moved after a local server has noted its previous location. If that local server requests the moved tuple, the previously storing server will receive the request. In this case, the previously storing server generates a re-route exception. The re-route exception causes the local server to query the coordination entity to determine the tuple's new location. This new location is then noted by the local server for future requests.

The use of tuples and tuple matching allows applications to use a common, flexible, lightweight format for information persistence and interchange. The applications may be local or remote and of heterogeneous types.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF THE PREFERRED EMBODIMENTS

Reference will now by made in detail to preferred embodiments of the invention, examples of which are illustrated in the accompanying drawings. Wherever convenient, the same reference numbers will be used throughout the drawings to refer to the same of like parts.

Figure 1:
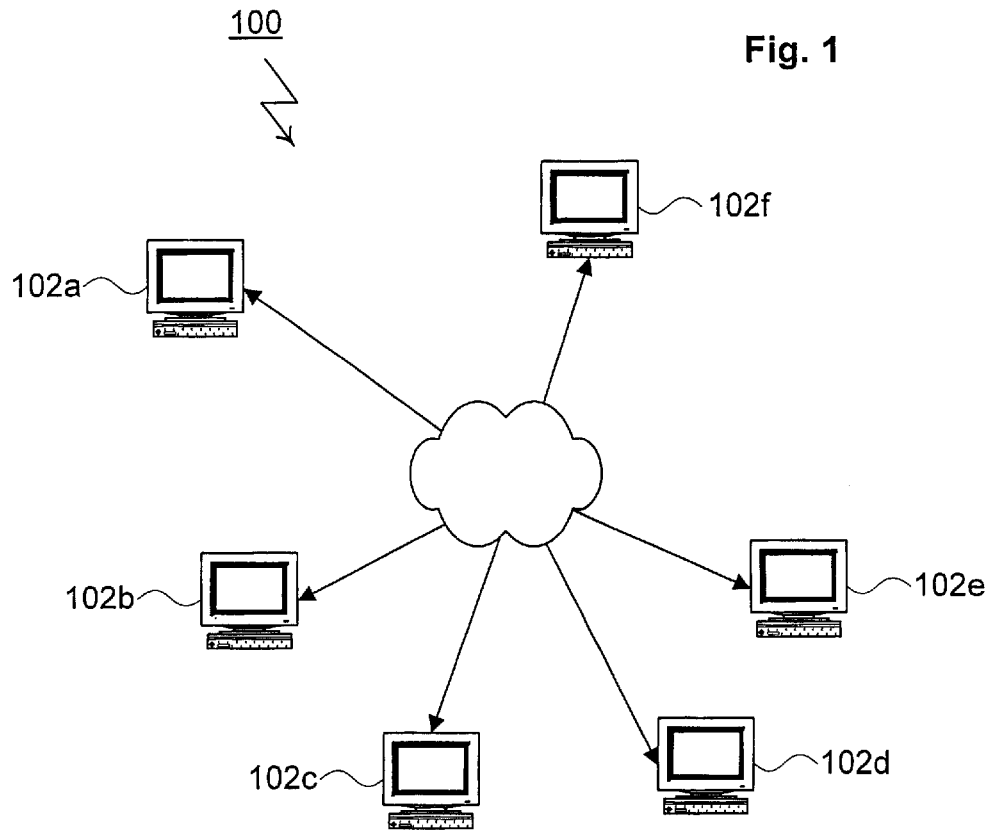
FIG. 1 is a block diagram of a computer network shown as an exemplary environment for an embodiment of the present invention.

In FIG. 1, a computer network 100 is shown as a representative environment for an embodiment of the present invention. Computer network 100 includes a number of servers, of which servers 102a through 102f are representative. Servers 102a through 102f are intended to be representative of the wide range of large and small computer systems that are used in computer networks of all types.

Figure 2:
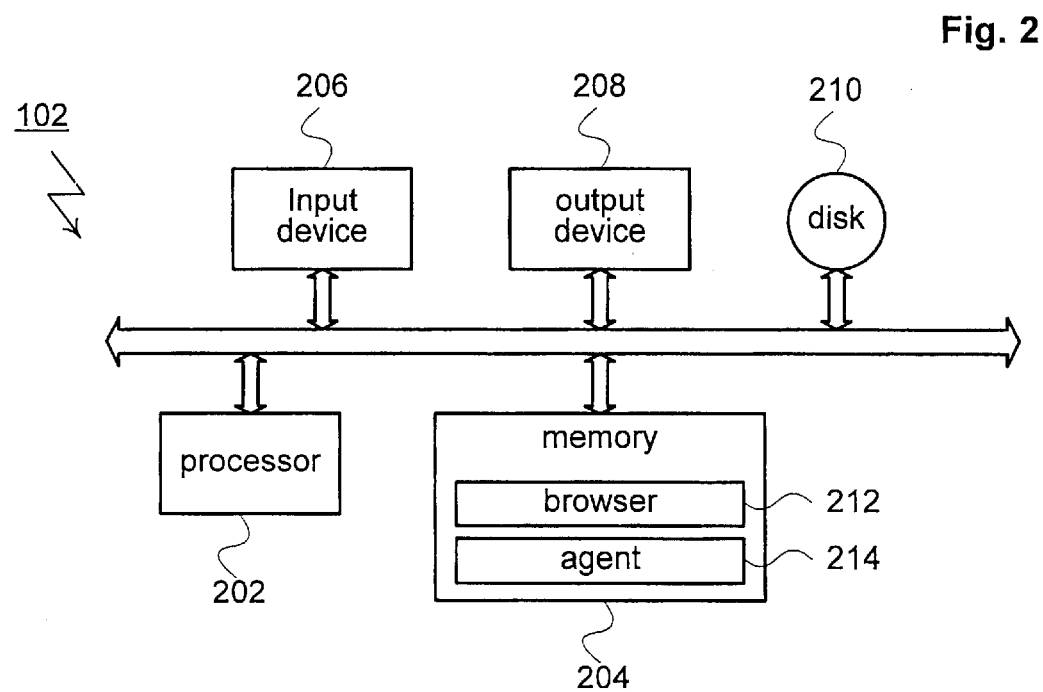
FIG. 2 is a block diagram of a server computer system as used in the network of FIG. 1.

FIG. 2 shows a representative implementation for a server system 102. Structurally, server 102 includes a processor, or processors 202, and a memory 204. Processor 204 can be selected from a wide range of commercially available or custom types. An input device 206 and an output device 208 are connected to processor 202 and memory 204. Input device 206 and output device 208 represent a wide range of varying I/O devices such as disk drives, keyboards, modems, network adapters, printers and displays. Each server 102 may also includes a disk drive 210 of any suitable disk drive type (equivalently, disk drive 210 may be any non-volatile mass storage system such as "flash" memory). The memory 204 includes browser 212 and agent 214.

Network 100 and servers 102 provide the physical underpinnings for an information space. The information space allows applications, executing within network 100 to store and exchange information. The information space is based on the tuple-space paradigm first introduced for the Linda coordination model. Tuples in the information space are defined in terms of an abstract base class. The base class includes methods that correspond to the methods in the Linda coordination model. The methods include:

write (entry)
read (template)
read-if-exists (template)
take (template)
take-if-exists (template)

The use of these methods and their correspondence to the methods in the Linda coordination model are more completely described in co-pending U.S. application Ser. No. 09/305,427 entitled "Method for Coordinating Activities And Sharing Information Using a Data Definition Language" filed May 5, 1999. That disclosure is incorporated in this document by reference. As described in that disclosure, the methods are preferably configured to store and retrieve information using XML—an emerging standard for internet data definition.

In general, it should be appreciated that the present invention is intended to have general applicability. Thus, the use of the particular methods described or the use of XML are intended to be exemplary. The present invention is specifically intended to be applicable to a wide range of Linda-like methods and information storage methodologies.

The base class is preferably used to define a single server subclass and a distributed server subclass. The single server subclass is used in cases where an information space is constructed to include only a single server 102. The distributed server subclass is used for cases like network 100 where multiple servers 102 are used. Each of these subclasses defines its own tuple subspace function. The tuple subspace function defined for the single server subclass directs all requests to store or access tuples to the single server 102. The tuple subspace function defined for the distributed server subclass routes all requests to store or access tuples to the server 102 where the tuple is or should be located.

Network 100 includes a coordination entity. The coordination entity is a network service hosted by one of the servers 102 included in network 100. In some cases, the coordination entity may be replicated on several servers 102 to increase fault tolerance or throughput. The coordination entity manages the storage of tuples within the information space included in network 100. In general terms, this means that the coordination entity controls the distribution of tuples across servers 102 (tuple management). The coordination entity also plays a key role in helping applications find the servers 102 where tuples are located (tuple routing).

The coordination entity performs the tuple management function at various times to achieve various goals. As part of this role, the coordination entity determines where new tuples are stored as they are defined by applications within network 100. This determination is generally made in a way that distributes tuples across network 100. This tends to enhance both load-balancing and fault-tolerance. In other embodiments, tuples can be distributed to achieve other goals such as data-locality or server-preference. The coordination entity makes this initial determination each time the write () method is invoked to establish a new tuple.

The coordination entity may also perform the tuple management function to migrate existing tuples within network 100. This can be used, for instance, to redistribute tuples for better load balancing. Tuples may also be migrated as part of planned outages, fail-over or hot swapping of servers 102.

The coordination entity performs the tuple routing function whenever an application accesses a tuple within network 100. To perform an access of this type, an application invokes one of the read (), read-if-exists (), take () or take-if-exists () methods. These methods are configured to maintain a cache, preferable within each server 102, of known tuple locations. The methods consult this cache before attempting to access a tuple. If the location of a desired tuple is contained in the cache, the methods use the known location. The actual process of accessing the tuple can then proceed using a range of networking methods such as remote method invocation (RMI), remote procedure call (RPC) or socket.

In some cases, an access method will be unable to locate a desired tuple using the cache of know tuple locations. The access methods are configured to consult the coordination entity whenever a cache miss of this type occurs. The coordination entity can then provide an authoritative response detailing the location of the desired tuple. This location can be used to access the desired tuple. The response is also used to update the cache to record the location of the tuple.

For typical embodiments of the present invention, network 100 does not include a protocol that allows the various caches to be invalidated when a tuple is migrated or removed. The present invention provides for this contingency though the use of re-route exceptions. A server 102 that previously stored a tuple generates this exception if an accessing server attempts to access the now migrated or removed tuple. The access methods are configured to retry RMI, RCP, socket or other network operations that generate re-route exceptions. As part of the retry, the access methods consult the coordination entity. The coordination entity then provides an authoritative response detailing the location of the desired tuple. This location is used for the retry and used to update stale data located in the cache of the accessing server 102. In other cases, network 100 may be configured to use a protocol that automatically invalidates stale cache data through message passing or other methodology.

The Linda-like tuple interface combined with the distributed nature of the information space provides applications with a generic and scalable mechanism for information storage, persistence and exchange. Applications that use this mechanism may be local or remote. The mechanism fully supports use by heterogeneous applications.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for information exchange and persistence, the method comprising the steps of:

providing an information space distributed across multiple servers on a computer network for the distributed storage of tuples across the multiple servers; and providing a coordination entity, the coordination entity configured to provide storage location information of a tuple stored on a first server to a second server over the computer network in response to a request for the storage location information of the tuple.

2. A method as recited in claim 1 wherein the information space is subdivided into subspaces and wherein the method further comprises a step of maintaining a cache of known tuple locations.

3. A method as recited in claim 2 wherein the coordination entity is configured to supply the subspace of a tuple when the location of that tuple is not included in the cache.

4. A method as recited in claim 2 wherein the coordination entity is configured to select the storage location of each tuple.

5. A method as recited in claim 2 further comprising transmitting a re-route exception in response to a request to access a tuple at a location other than that currently selected by the coordination entity.

6. A method as recited in claim 2, wherein each cache is located at one of the servers.

7. A method for exchanging information between applications, the method comprising the steps of:

requesting, by a client application, the storage of a tuple in an information space distributed across multiple servers on a computer network for the distributed storage of tuples across a computer network;

receiving the request for the storage of a tuple in an information space from the client application at a proxy server;

transmitting a coordination entity request from the proxy server to the coordination entity over the computer network;

selecting, by a coordination entity, at least one of the servers for storage of the tuple.

8. A method as recited in claim 7 further comprising the steps of:

searching for the tuple location in a cache of known tuple locations;

requesting the tuple location from the coordination entity if the location of the tuple is not included in the cache; and accessing the tuple at the location retrieved from the cache or the coordination entity.

9. A method as recited in claim 8 further comprising:

adding the location retrieved from the coordination entity to the cache of known tuple locations.

10. A method as recited in claim 8 further comprising the steps:

receiving a re-route exception; and requesting the tuple location from the coordination entity in response to receiving the re-route exception.

11. A method as recited in claim 10 further comprising:

adding the location retrieved from the coordination entity to the cache of known tuple locations.

12. A method as recited in claim 8 wherein the step of accessing is performed using remote method invocation (RMI).

13. A method as recited in claim 7 wherein the coordination entity performs the step of selecting in a way that load balances the information space.

14. A method for information exchange and persistence, the method comprising:

requesting, by a client application, a stored tuple by transmitting a client request from a client device, over a computer network, to a first server;

determining by the first server whether a storage location associated with the stored tuple is stored at the first server;

forwarding the client request by the first server over the computer network to a server associated with the storage location if the first server determines that the storage location is stored at the first server;

transmitting a query to a coordination entity by the first server if the first server determines that the storage location is not stored at the first server;

receiving a query result from the coordination entity at the first server, the query result including storage location information associated with the stored tuple;

using the query result by the first server to request the stored tuple from a server associated with the storage location.

15. The method of claim 14, further comprising storing at the first server the storage location information associated with the stored tuple as received in the query result.

16. The method of claim 14, further comprising receiving a re-route exception from server associated with the server associated with the storage location, the re-route exception causing the first server to transmit a query to the coordination entity.

* * * * *